3,364,061
EMULSION COATING OF CELLULOSIC FILMS
Reid L. Mitchell and Charles F. Murphy, Morristown, and Douglas Allen, Parsippany, N.J., assignors to Rayonier Incorporated, Shelton, Wash., a corporation of Delaware
Filed Sept. 3, 1964, Ser. No. 394,264
7 Claims. (Cl. 117—93.31)

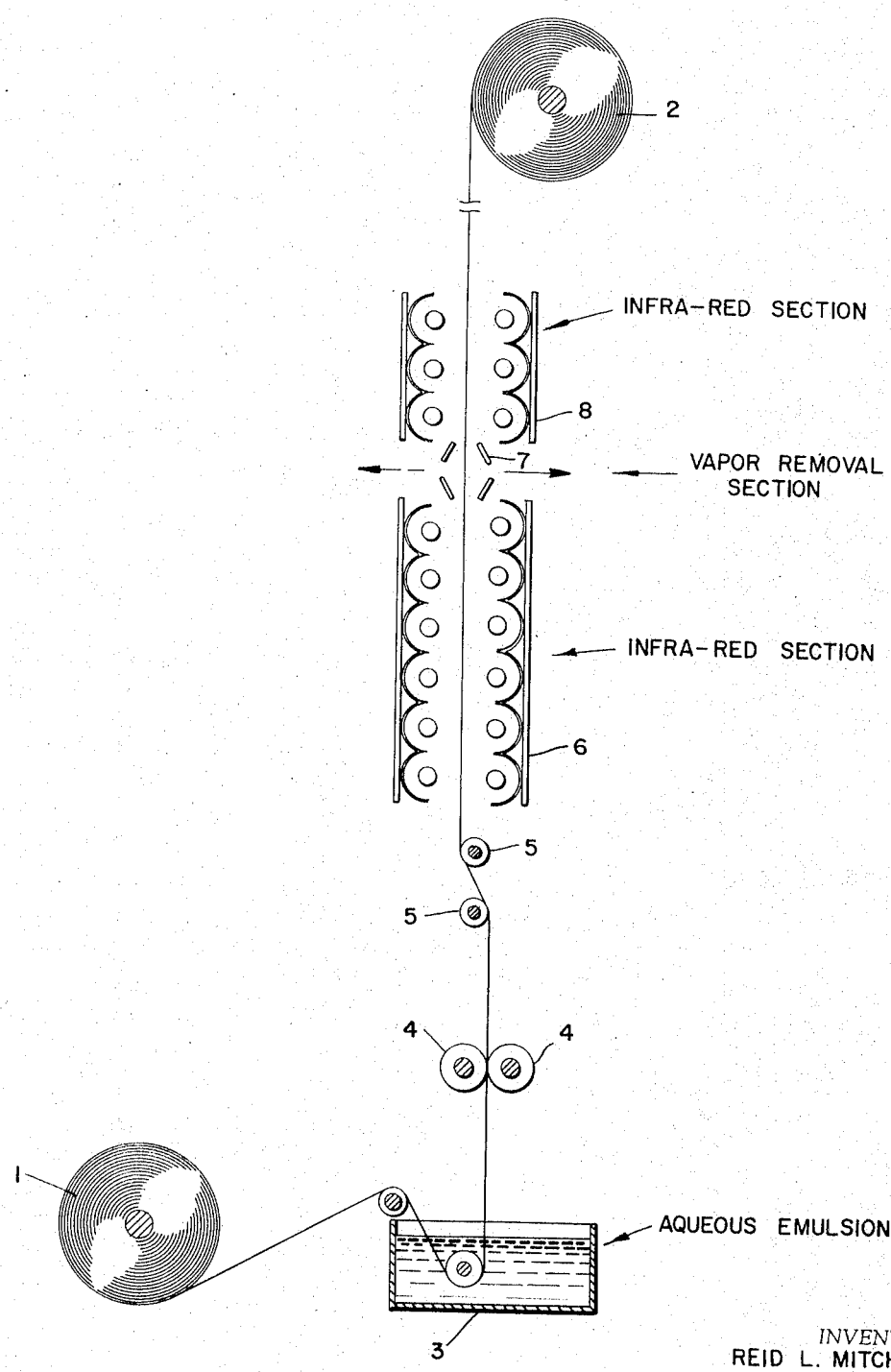

This invention relates to moistureproof type coating of transparent cellulosic films with hydrophobic resins, and has for its object the provision of an improved process for applying emulsion coatings of thermoplastic hydrophobic resins to cellulosic films which is efficient, economical and produces a superior product. The process of the invention is especially applicable to the emulsion coating of all types of celluloic films, and comprises the heating of the applied emulsion with infrared radiation to first flash off water followed by additional heating with infrared radiation of the residual thermosplastic coating to fuse the resin and bond it to the cellulosic film.

The process of the invention is especially effective in the coating of alkali-soluble transparent films of hydroxyethylcellulose and also regenerated cellulose films, frequently called cellophane with emulsions of such thermoplastic compositions as the copolymers of vinylidene chloride with other monomers. A family of such copolymers is made and sold by the Dow Chemical Company under the trade name Saran in which vinylidene chloride is copolymerized with vinyl chloride, acrylonitrile or methyl methacrylate. The aqueous coating emulsions formulated from the Saran type copolymers used in this process may also include a very small amount of polyethyleneimine "anchoring agent" which improves the adhesion to the film. Suitable emulsions of such thermoplastic resins usually contain from 10 to 50 percent by weight of the resin in water. Other suitable thermoplastic resins which may be applied to the films include polyethylene and polyamides together with some portion of organic solvent and surfactants which assist the emulsification in water, and in some cases, solvents such as toluene and/or isopropanol.

The coating of relatively rough surfaced hydrophilic paper webs with hydrophobic resins such as Saran emulsions is well known, but the attempts to extend this practice to the coating of cellophane and hydroxyethylcellulose have not been successful. The water component of the emulsion rapidly penetrates and swells the hydrophilic base film visibly resulting in imperfections and distortions when the coated film is dried in the conventional steam-heated air dryer system. As a result, transparent cellulosic films of this type are not coated with aqueous emulsions of resins.

This invention is based on the discovery that the water of the applied aqueous emulsion must be removed before it has been completely absorbed or penetrates too deeply into the base film and that the coating of thermoplastic resin must be post-heated to a temperature within about ±20° C. of the fusion point of the resin, preferably at a temperature equal to or above said fusion point in order to fuse and bond the resin to the film and provide continuity of coating and good adhesion. The invention is based on the further discovery that the water of the emulsion can be flashed off very quickly with infrared radiation in the range of 3 to 4 microns before the water-sensitive base film can absorb any appreciable amount of water from the aqueous emulsion and swell or become distorted. Following the removal of water infrared radiation, preferably in the range of 6 to 9 microns, is applied on the residual resin coating. This latter action of radiant heat on the coating following water removal selectively fuses the remaining resin phase into a consolidated smooth film which is chemically bonded to the base film.

The process of the invention comprises a series of stages of treatment on a continuously moving cellulosic base film which produces a transparent film having on one or both surfaces a hydrophobic coating which is free of distortion, with an exceptionally flat and glossy surface that presents an effective moisture barrier. The coating operation is less expensive and more efficient than the presently used processes, and provides a superior film.

The accompanying drawing illustrates diagrammatically an arrangement of apparatus for treating a continuously moving base film of indefinite length according to the invention. The base film, preferably hydroxyethylcellulose having about four percent of substituted ethylene oxide from the roll 1, is continuously passed through the system and the coated film is wound into roll 2. The base film enters the tank 3 and is coated on both sides with the aqueous emulsion, advantageously a Saran emulsion of vinylidene chloride copolymerized with vinyl chloride and containing about one-fourth percent of polyethyleneimine as an internal anchoring agent. Two contacting base films may be passed through the system in face-to-face contact to coat only one surface of each base film. The film or the films, as the case may be, passes between the doctor rolls 4 to remove excess emulsion and then over rolls 5 to smooth the applied emulsion. Each set of rolls 4 and 5 is power driven at a desired constant speed.

The coated film passes through the infrared section 6 and is heated by radiant energy, preferably at 3 to 4 microns. The residence time of the film should be less than four seconds from the coating of the base film with the aqueous emulsion to completion of the drying in the first infrared section 6. This rapid drying at about 400° C. flashes off most of the water and prevents any appreciable absorption of water into the base film. Substantial absorption of water into the base sheet causes distortion, and deformation resulting from shrinkage and swelling of the film in process. Film shrinks when dried, swells when wet primarily in thickness and in the transverse or width dimension. In section 7 the water vapor is vented to the atmosphere. The film then enters the infrared section 8 wherein a radiant energy, rather specific to the resin of the coating, is applied to fuse the resin and effect chemical bonding to the base film. It is preferred to use from 6 to 9 microns in this section. The resulting coated base film is transparent, substantially distortion-free, imperfection-free, streak-free, glossy and has good hydrophobic properties presenting an excellent barrier to transmission of water vapor. A base-film of hydroxyethyl cellulose is more dimensionally stable than a viscose base film. On the other hand, it is also more hydrophyllic than viscose which makes it difficult to coat with any aqueous media without distortion in ordinary systems. The two-stage infrared drying and fusion system of this invention properly controlled as it is to restrict penetration of the water into the base-film permits an excellent coating application never before possible in conventional systems.

The following are examples of the type of aqueous emulsion formulations which may be used in the invention:

(A) Parts by weight

| | |
|---|---|
| Copolymer of vinylidene chloride (93%)—vinyl chloride (7%) | 15.0 |
| Water | 84.5 |
| Polyoxyethylene-polyoxypropylene block copolymer (surfactant) | 0.5 |

(B)

| | |
|---|---|
| Copolymer of vinylidene chloride (88%)—acrylonitrile (12%) | 20.0 |
| Water | 79.0 |
| Alkylaryl polyether derivative (surfactant) | 1.0 |

(C)

| | |
|---|---|
| Copolymer of vinylidene chloride (95%)—methyl methacrylate (5%) | 15.0 |
| Water | 84.7 |
| Nonyl phenol polyglycol ether alcohol (surfactant) | 0.3 |

(D)

| | |
|---|---|
| Polyethylene (A.C. Resin 626) | 40.0 |
| Water | 59.5 |
| Polyoxyethylene sorbitan monooleate (surfactant) | 0.5 |
| (pH adjusted to 7.5 to 9.0). | |

(E)

| | |
|---|---|
| Polyamide, type 6—6 resin | 31.0 |
| Toluene | 20.0 |
| Polyoxyethylene sorbitan monooleate (surfactant) | 2.0 |
| Isopropanol | 30.0 |
| Water | 17.0 |

The following examples illustrate processes of the invention for coating base films with thermoplastic hydrophobic resins to give moisture proof characteristics:

*Example I*

Hydroxyethylcellulose film with degree of substitution of 4% ethylene oxide and containing 7 percent moisture and 18 percent glycerine softener on a total weight basis was prepared in roll form on a conventional casting machine. The roll of film was then coated by quickly passing it through an aqueous emulsion of a copolymer of vinylidene chloride and acrylonitrile containing 15 percent copolymer by weight to which had also been added ¼ percent by weight polyethyleneimine to act as an anchoring agent. The polyethyleneimine improves the bond between the hydrophylic hydroxyethylcellulose base film and the hydrophobic copolymer coating.

The coated base film was passed rapidly between driven metering rolls 4 which regulate the amount of coating material applied and then over driven smoothing rolls 5 which distribute the liquid emulsion uniformly over the film surface. The infrared section 6 was set to emit radiation at a controlled wave length of 3 to 4 microns to rapidly flash off the bulk of the water in the coating before it could penetrate the base film. To minimize the water penetration effect on the base hydroxyethylcellulose film after application of the emulsion, film speed and radiant energy output were adjusted so that the temperature in the path of the film reached 400° C. This treatment period should be less than four seconds, preferably from 1 to 2 seconds. The upper infrared section 7 was set to radiate energy at 7 to 9 microns which is a range preferentially absorbed by the copolymer resin but to a much lesser extent by the hydroxyethylcellulose base film. This preferential heating of the thermoplastic copolymer after rapid removal of the water component fused and flattened the coating resin layer and resulted in a coated base film having unusually good appearance, gloss, moisture barrier properties and substantial freedom from visible coating irregularities.

Residual moisture in the coated dried film was controlled so that it equaled the 7% moisture in the original film, and the coated film then passed over chilled rolls to cool the thermoplastic coating and render it non-tacky before it was rewound in roll form for future use.

*Example II*

A roll of hydroxyethylcellulose base film, containing 4% substituted ethylene oxide, of 0.00080 in. gauge thickness was dip coated with an aqueous emulsion containing 15% by weight of polyvinylidene chloride-polyvinyl chloride in 90/10 ratio and led immediately into an infrared heating chamber radiating at a wave length of about 3 microns, exposed for 2 seconds to a temperature of about 400° C. (measured with a surface pyrometer) to flash off the major part of the moisture which was largely removed from the drying zone by use of a vacuum slice draw off. The sheet then proceeded through a second infrared bank radiating at a wave length of about 8 microns, exposed for 1 second, to fuse the coating particles and then passed through a circulating air section to cool the film before being wound up. The temperature in the second infrared section was adjusted to match the fusion temperature of the resin and for the case above was maintained at about 300° C. The film was then cooled quickly in the air chamber to about 40° C.

The coated film had excellent appearance, high surface gloss, was free of surface dimples and scratches and wound up at exactly the same width as the original roll, showing no shrinkage. Coating adhesion and heat seal properties were excellent.

We claim:
1. The process of coating a cellulosic film of the group consisting of regenerated cellulose and hydroxyethylcellulose which comprises applying on the film an aqueous emulsion of a thermoplastic hydrophobic resin, promptly after applying the emulsion flashing off the water by heating with infrared radiation before any appreciable amount of water is absorbed by the film, and then applying to the residual resin additional infrared radiation of specific wave length preferentially absorbed by the resin to fuse the resin and adhesively bond it to the film.

2. In the process of claim 1, treating a film of hydroxyethylcellulose having from 3 to 8 percent by weight of substituted ethylene oxide and applying to the film an aqueous emulsion which is a copolymer of vinylidene chloride and a compound of the group consisting of vinyl chloride, acrylonitrile and methyl methacrylate.

3. The process of claim 2 in which the aqueous emulsion includes a small amount of polyethyleneimine.

4. The process of applying a hydrophobic coating on a film of hydroxyethylcellulose of indefinite length in which the film is continuously passed through stages of treatment comprising applying on at least one side of the film a uniform coating of an aqueous emulsion of a thermoplastic hydrophobic resin, promptly applying infrared radiation on the coating to flash off water before any appreciable amount of water is absorbed by the film, and then applying on the residual resin specific energy infrared radiation preferentially absorbed by the resin to fuse and bond the resin to the film.

5. The process of claim 4 in which the infrared radiation to flash off the water from the coated emulsion before it can substantially penetrate the film is in the range from 3 to 4 microns and is applied for 1 to 4 seconds after application of the emulsion and the infrared radiation to fuse the resin ranges from 6 to 9 microns for various coating resins and is applied for not more than about 1 second following water flash off.

6. The process of claim 4 in which the aqueous emulsion contains a copolymer of vinylidene chloride and a compound of the group consisting of vinyl chloride, acrylonitrile and methyl methacrylate.

7. The process of claim 4 in which the infrared radiation is applied to the emulsion coating less than 4 seconds after applying the coating to minimize water penetration into the film, and after flashing off the water applying radiation of from 6 to 9 microns for from 1 to 3 seconds to fuse the coating resin, such radiation designed to give temperature near the fusion point of the specific resin.

References Cited
UNITED STATES PATENTS

| | | | |
|---|---|---|---|
| 2,618,575 | 11/1952 | Oswin | 117—145 X |
| 2,889,806 | 6/1959 | Conant | 117—119.6 X |
| 3,150,864 | 9/1964 | Fetner et al. | 34—4 X |

ALFRED L. LEAVITT, *Primary Examiner.*

J. H. NEWSOME, *Assistant Examiner.*